Patented Feb. 6, 1951

2,540,964

UNITED STATES PATENT OFFICE 2,540,964

11-KETOPREGNENES AND METHOD OF PRODUCING THEM

Lewis H. Sarett, Princeton, N. J., assignor to Merck & Co., Inc., Rahway, N. J., a corporation of New Jersey No Drawing. Application February 23, 1946, Serial No. 649,760

13 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ 4,5-3,11,20-triketo-17(β), 21-dihydroxy pregnene. This application is a continuation-in-part of copending application Serial No. 605,194, filed July 14, 1945, now abandoned.

This hormone is known to occur naturally in the adrenal cortex; it has the structural formula:

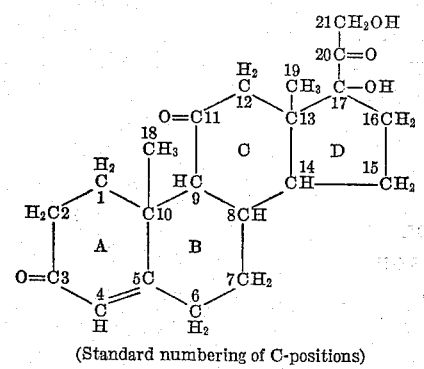

(Standard numbering of C-positions)

This formula, for purposes of convenience, is hereinafter reproduced below in the abbreviated form:

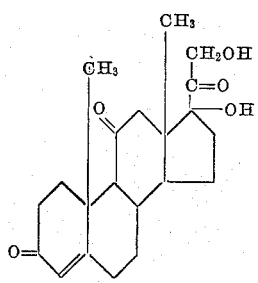

In the following description of the invention, the stereochemical relationships of substituents are indicated by the following conventions:

1. A substituent at the C-3 position which is trans to the C-10 methyl group is parenthetically designated (α).

2. A substituent at the C-17 position, the stereochemical configuration of which is identical with that of the naturally occurring adrenal hormones, is parenthetically designated (β); the epimeric configuration is designated (α). In the structural formulae the former configuration is shown by writing the C-17 substituent (hydroxyl) to the right of the C-17 carbon side chain, thus

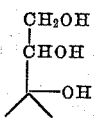

in the latter case above the side chain, thus

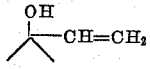

3. The stereochemical relationship of rings A and B is indicated in the formulae by a solid line representing the valence bond in the cis configuration.

In accordance with the present invention it is now found this hormone can be synthesized by reactions indicated as follows:

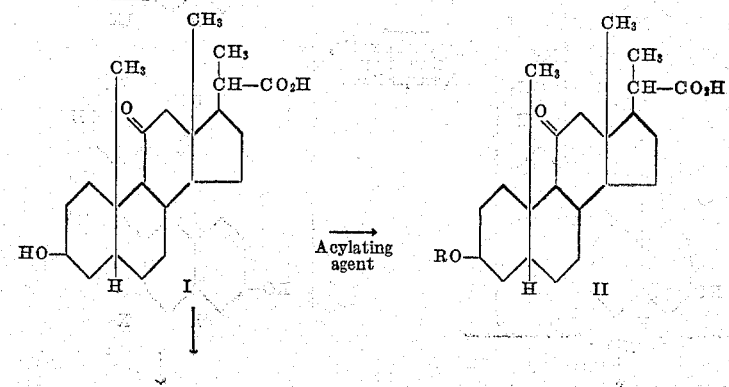

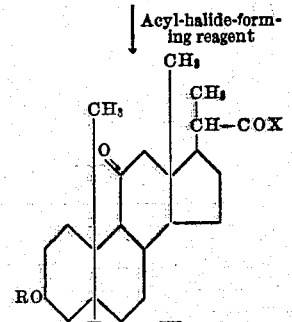
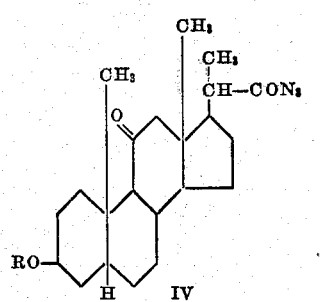
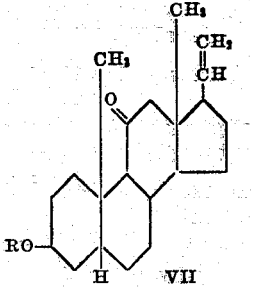
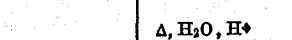
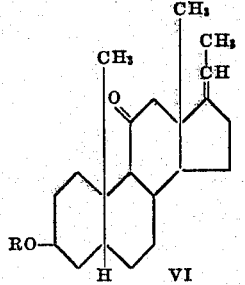
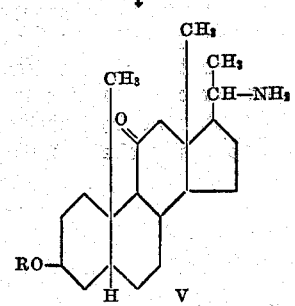
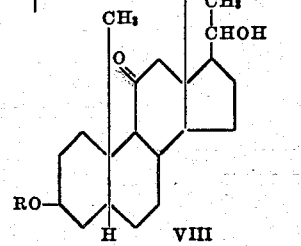
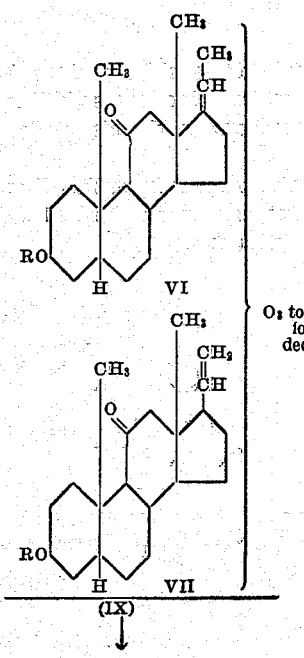
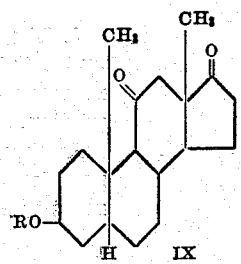
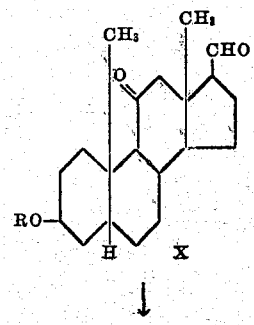

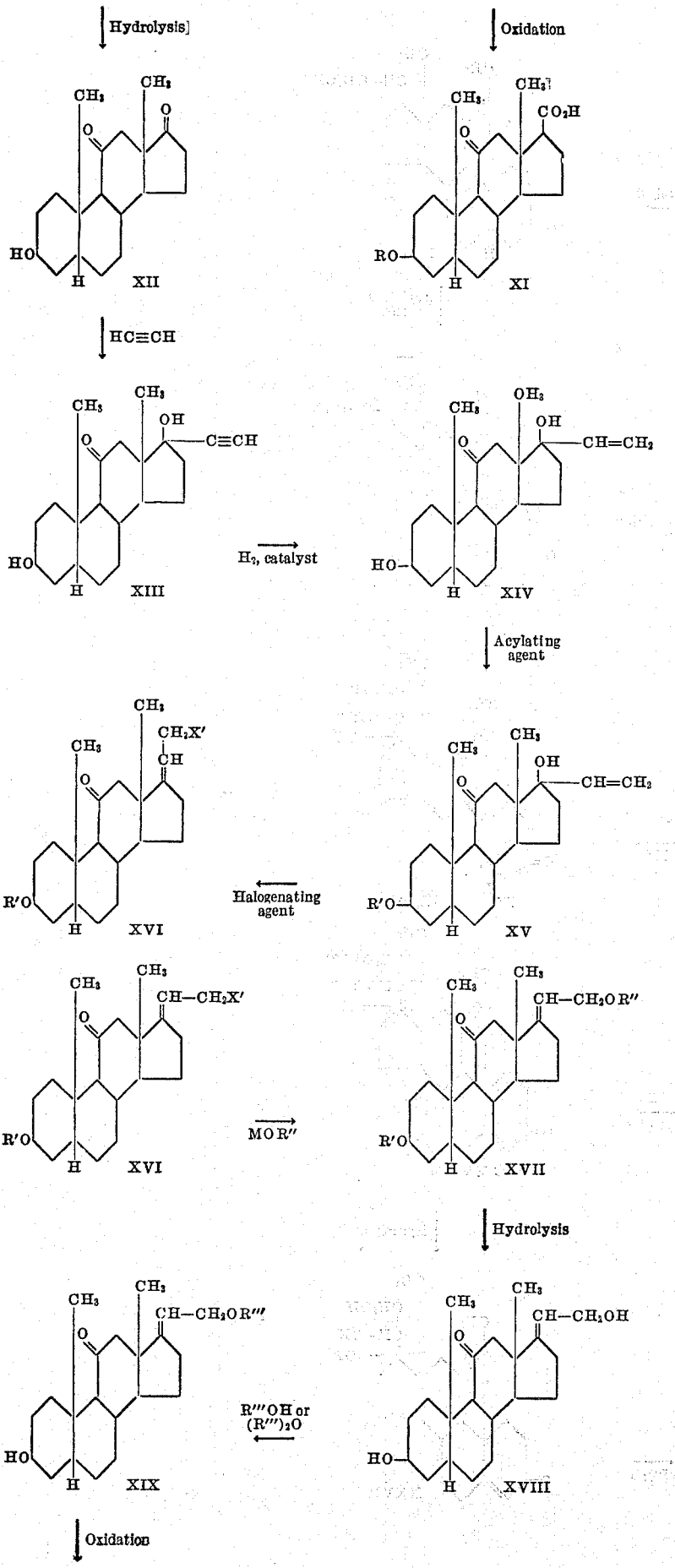

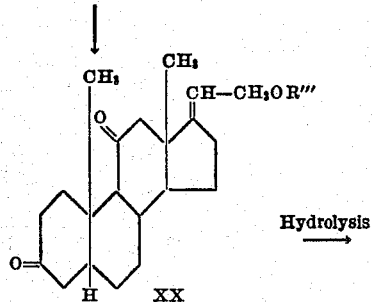
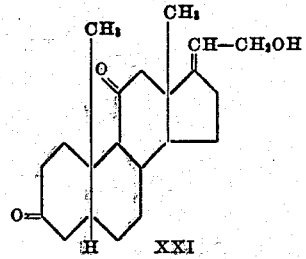
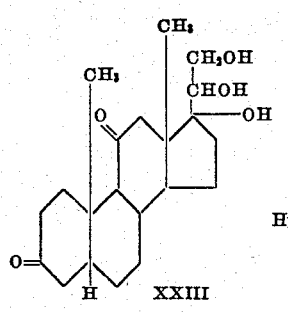
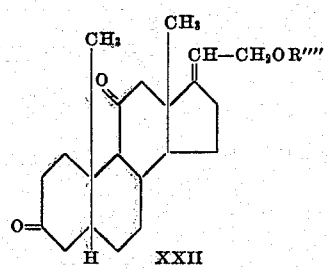
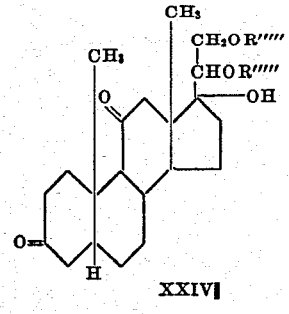
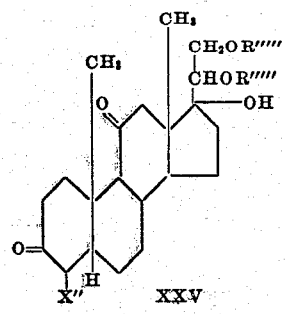
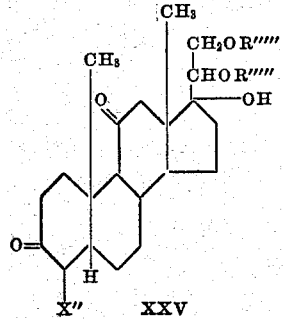
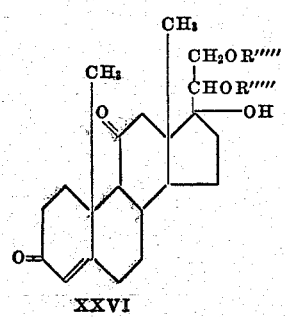
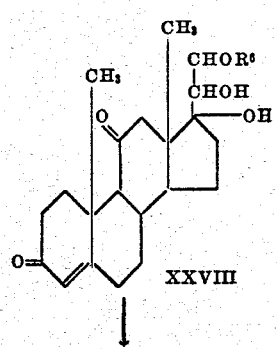
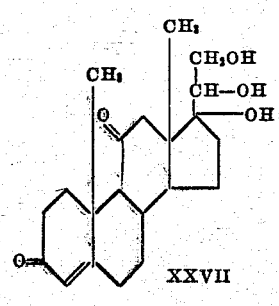

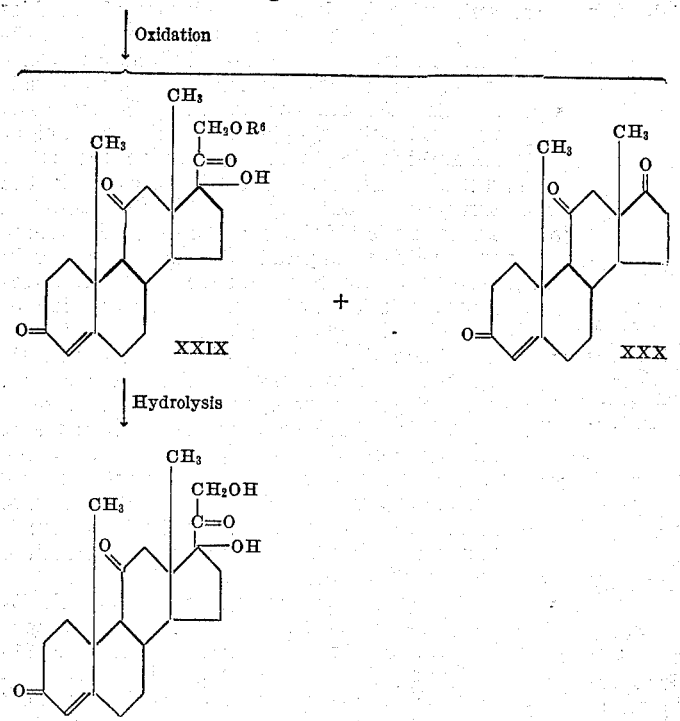

In the above formulae, R, R', R'', R''', R'''', R''''', and R⁶ are acyl; X, X' and X'' are halogen, and M is an alkali metal or an alkaline earth metal/2.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-ketobisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali. Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy-11-ketopregnene (XIV) which is acylated to form $\Delta^{20,21}$-3-acyloxy-17-hydroxy-11-ketopregnene (XV), and this compound is halogenated to produce $\Delta^{17,20}$-3-acyloxy-11-keto-21-halopregnene (XVI). When treated with an alkali metal salt or alkaline earth metal salt of an organic acid, this compound yields $\Delta^{17,20}$-3,21-diacyloxy-11-ketopregnene (XVII) which is hydrolyzed producing $\Delta^{17,20}$-3,21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester $\Delta^{17,20}$-3,11-diketo-21-acyloxy-pregnene (XX). This product (XX) is hydrolyzed and the $\Delta^{17,20}$-3,11-diketo-21-hydroxypregnene (XXI) thus formed is acylated producing $\Delta^{17,20}$-3,11-diketo-21-acyloxypregnene (XXII). Hydroxylation at the unsaturation of the last mentioned compound (XXII) results in the production of 3,11-diketo-17($\beta$),20,21-trihydroxypregnene (XXIII) which is then acylated to form 3,11-diketo-17($\beta$)-hydroxy-20,21-diacyloxypregnene (XXIV). When brominated, this compound yields 3,11-diketo-4-bromo-17($\beta$)-hydroxy-20,21-diacyloxypregnene (XXV).

This compound is then treated with a reagent capable of removing the elements of hydrogen bromide, thereby producing $\Delta^{4,5}$-3,11-diketo-17($\beta$)-hydroxy-20,21-diacyloxypregnene (XXVI) which on hydrolysis forms $\Delta^{4,5}$-3,11-diketo-17($\beta$),20,21-trihydroxypregnene (XXVII). Partial acylation of this compound (XXVII) gives $\Delta^{4,5}$-3,11-diketo-17($\beta$),20-dihydroxy-21-acyloxypregnene (XXVIII) which, when oxidized, yields a mixture of $\Delta^{4,5}$-3,11,20-triketo-17($\beta$)-hydroxy-21-acyloxypregnene (XXIX) and $\Delta^{4,5}$-3,11,17-triketo androstene (XXX). Compounds (XXIX) and (XXX) may be separated by conventional operations, for example chromatography, and compound (XXIX) hydrolyzed to produce the desired adrenal hormone, $\Delta^{4,5}$-3,11,20-triketo-17($\beta$),21-dihydroxypregnene.

The present invention is concerned with compounds having basic structural formulae of the type illustrated by intermediates VI through XII above, i. e., compounds represented by the formula:

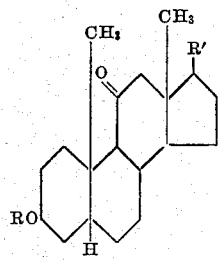

wherein R is hydrogen or an acyl group, and R' is a radical of the group consisting of alkylidene, groups readily convertible to alkylidene by removal of $H_2O$, and keto, particularly such compounds wherein R' is one of the radicals represented by the formula:

=CHCH$_3$, —CH=CH$_2$, —CHOHCH$_3$ and =O

The invention also embraces processes for the preparation of compounds of the class above defined and, additionally, processes for the preparation of the compounds of this type wherein R' is formyl or carboxy.

In accordance with the present invention, a 3-acyloxy-11-keto-20-aminopregnane or a salt thereof, but preferably 3-acetoxy-11-keto-20-aminopregnane, is treated with a reagent which in warm aqueous solution can convert a primary amino group to a hydroxyl, and by this treatment a mixture of several reaction products including $\Delta^{17,20}$-3-acyloxy-11-ketopregnene, $\Delta^{20,21}$-3-acyloxy-11-ketopregnene and 3-acyloxy-11-keto-20-hydroxypregnane, is obtained. Although the reagent presently preferred for use in this treatment is nitrous acid which if desired can be formed in situ, oxides of nitrogen that yield nitrous acid when in contact with water can be substituted therefor. It has been found, pursuant to this invention, that formation of the desired unsaturated products in preference to the hydroxy compound can be favorably influenced by conducting the reaction in pyridine which, for this purpose, is the preferred solvent medium although alcohol water or acetic acid may be used with less satisfactory results.

The reaction mixture of $\Delta^{17,20}$-3-acyloxy-11-ketopregnene, $\Delta^{20,21}$-3-acyloxy-11-ketopregnene and 3-acyloxy-11-keto-20-hydroxypregnane obtained as above described is next treated with a reagent which, in reacting with the 3-acyloxy-11-keto-20-hydroxypregnane component of the mixture, produces the effect of increasing the relative proportion of unsaturated components in the mixture while decreasing or substantially wholly removing the hydroxy component. Of this class of reagents, which can be conveniently defined as those capable of converting a hydroxyl-containing alkyl substituent to alkylidene by removal of $H_2O$, the reagent presently preferred is an aromatic sulfonyl halide employed in conjunction with a base such as hydrazine, alkali metal hydroxides and alkoxides, alkaline earth hydroxides alkoxides, or tertiary amines, specifically p-toluene sulfonyl chloride and collidine or pyridine. As a result of this treatment, a mixture of $\Delta^{17,20}$-3-acyloxy-11-ketopregnene and $\Delta^{20,21}$-3-acyloxy-11-ketopregnene is obtained that is used in the next step without being separated into its components.

The next step in the process according to this invention is treatment of this last described mixture of unsaturated products with ozone, preferably while such products are dissolved in an organic solvent, whereby a mixture of ozonides is obtained that upon decomposition yields 3-acyloxy-11-keto-17-formyletiocholane and 3-acyloxy-11,17-diketoetiocholane. Among the solvents useful for this operation are the lower aliphatic alcohols simple low-molecular-weight esters and the like, including mixtures thereof; a mixture of methanol and ethylacetate is the presently preferred solvent. The ozone used in this reaction is obtained by conventional operations i. e. high potential electrical discharge in an oxygen atmosphere, and the ozone-containing oxygen is bubbled through the solution of the unsaturated compounds in the organic solvent to yield the desired ozonides. Decomposition of the ozonides to produce the 17-formyl and 17-keto etiocholane compounds above mentioned is effected by adding a mild reducing agent, e. g. preferably zinc dust and acetic acid, to the ozonide mixture, warming it gently and then removing unreacted reducing agent. The mixture of decomposition products thus obtained then is treated with an oxidizing agent such as potassium permanganate (which is preferred for this purpose), chromic acid or the like, whereby the 3-acyloxy-11-keto-17-formyl-etiocholane component of the mixture is converted to 3-acyloxy-11-ketoetiocholanic acid while the 3-acyloxy-11,17-diketoetiocholane remains unaffected. The acid component of this mixture may be separated by alkali treatment and converted to certain useful products such as dehydrocorticosterone or, if desired it can be converted to 3-acyloxy-11,17-diketoetiocholane.

The conversion of 3-acyloxy-11-ketoetiocholanic acid to 3-acyloxy-11,17-diketoetiocholane may be effected as follows: the above-mentioned acid starting material may be converted to the corresponding carboxyhalo compound by treatment with a reagent capable of converting a —CO$_2$H group to a —CO (halogen), e. g. a thionyl halide, and this carboxyhalo compound may then be treated with an azide, e. g. sodium azide, followed by decomposition preferably by heating with a dilute aqueous acid, whereby 3-acyloxy-11-keto-17-aminoetiocholane may be obtained. By treating this compound with a hypohalous acid followed by heating at 25°–100° C. with an organic base such as pyridine or collidine, and then hydrolyzing the product with a dilute acid, 3-acyloxy-11,17-diketoetiocholane may be obtained.

The 3-acyloxy-11,17-diketoetiocholane produced as hereinbefore described is next treated with an alkali under saponification conditions, e. g. refluxing with a lower aliphatic alcohol solution of an alkali metal hydroxide, whereby 3-hydroxy-11,17-diketoetiocholane is obtained. If desired this last-mentioned compound can be treated with an oxidizing agent, preferably chromium trioxide in dilute acetic acid, to produce 3,11,17-triketoetiocholane (M. P. 134°–135° C.).

The following example of the practice of the instant invention is provided by way of illustration, not of limitation.

*Example*

$\Delta^{17,20}$-*3-acetoxy-11-ketopregnene* (VI), $\Delta^{20,21}$-*3-acetoxy-11-ketopregnene* (VII) *and 3-acetoxy-11-keto-20-hydroxypregnane* (VIII).—The starting material used in the operations now to be described, i. e., 3(a)-acetoxy-11-keto-20-aminopregnane, may be obtained by the reactions described in general terms above and disclosed in detail in the present inventor's copending application, Serial No. 649,759, filed February 23, 1946, now Patent No. 2,492,188. A mixture of about 57.8 g. of this starting material, approximately 250 cc. of pyridine, about 21.3 g. of pyridine hydrochloride and 44 g. of sodium nitrite was heated to 75° C. on a steam bath, then about 150 cc. of water was added and heating was continued until nitrogen evolution ceased. After in vacuo distillation to remove the major portion of the pyridine and dilution of the residue with water, extraction with ether yielded an ether solution which, after washing with water, hydrochloric acid (0.5 N.) and more water, was reduced to dryness in vacuo to yield a residue. This residue contained, in addition to the desired $\Delta^{17,20}$-3($a$)-acetoxy-11-ketopregnene, certain other compounds including $\Delta^{20,21}$-3($a$)-acetoxy-11-ketopregnene, 3($a$)-acetoxy-11-keto-20-hydroxypregnane, unreacted 3($a$)-acetoxy-11-keto-20-aminopregnane and the corresponding hydrolysis products, i. e., $\Delta^{17,20}$-3($a$)-hydroxy-11-ketopregnene, $\Delta^{20,21}$-3($a$)-hydroxy-11-ketopregnene, 3($a$)-hydroxy-11-keto-20-hydroxypregnane and 3($a$)-hydroxy-11-keto-20-aminopregnane. This mixed product was obtained as an oil.

The oil so obtained was dissolved in 5.5 cc. of pyridine, 3.3 grams of p-toluene sulfonyl chloride were added, and the solution left at room temperature for 62 hours. Water and ether were again added until layer separation took place, the ether layer was separated, washed with dilute acid, alkali and water, and evaporated to dryness. The oil thus recovered was then refluxed with collidine for one-half hour. The solution was cooled, dissolved in ether, washed with dilute hydrochloric acid and water, then concentrated to dryness on a steam bath.

The mixture of unsaturates so obtained was dissolved in equal parts of ethyl acetate and methanol and then treated with twice the theoretical quantity of ozone at −78° C. The solution was then treated with zinc dust and acetic acid, warmed to room temperature, decanted, and concentrated in vacuo. The residue was dissolved in ether, washed with water and dilute alkali, and evaporated to dryness.

The residue was then dissolved in 80 cc. of pure acetone and treated with 16 cc. of a 5% potassium permanganate solution. After one hour at room temperature, the acetone was removed in a stream of dry air, the residue acidified and extracted with ether. Extraction of the ethereal solution with dilute potassium carbonate, followed by acidification of the potassium carbonate extract, filtration and crystallization from dilute acetone gave 3($a$)-acetoxy-11-ketoetiocholanic acid. The neutral fraction from the extraction was concentrated, treated with Girard's reagent T, and there was obtained about 30% yield of 3($a$)-acetoxy-11,17-diketoetiocholane.

Refluxing with 1-N-methanolic potassium hydroxide gave the corresponding hydroxy diketone, melting point 187°–188° C. and having the formula:

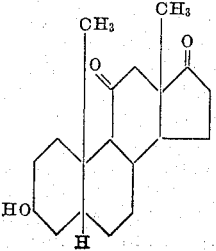

While the above example is limited to the 3-acetoxy compound, it will be understood that compounds having, instead of the acetyl group, other acyl radicals, such as those derived from propionic, butyric, valeric, caproic, capric, benzoic, toluic acids, come within the scope of the invention, the particular acid used being dictated chiefly by matters of convenience and cost.

Thus the invention includes the intermediates having the structural formula:

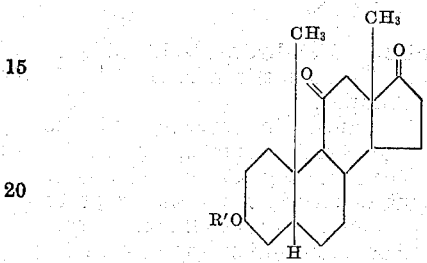

where R' is a member of the group consisting of acyl and H.

While in the example the starting material used had the hydroxy group in the 3 position in the trans form, a compound having this group in the cis form may be used as the steric configuration of the hydroxy group in the 3 position is not important.

The temperatures mentioned in the above example are room temperatures unless otherwise indicated. The temperatures, however, are not critical and the reactions may be carried out at higher or lower temperatures; but extremely high temperatures should be avoided because of the likelihood of decomposition of the desired products which results from operation at such temperatures.

Unless otherwise stated, the reagents can be used in different proportions than are indicated in the above example; the proportions unless otherwise indicated, are not critical provided enough of the reagents is employed to assure substantially complete reaction to produce the desired products.

All melting points in this specification are corrected.

The compounds above described having the basic structural formula:

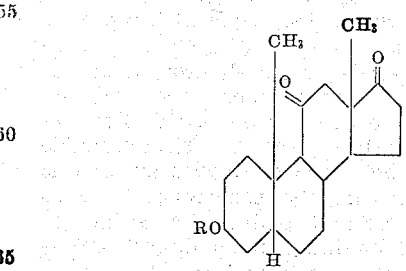

wherein R is hydrogen or acyl, can if desired be converted to a corresponding compound wherein the 3-position substituent is a keto group. In this operation the starting material used is the compound of the above formula wherein R is hydrogen (which if desired can be obtained by saponification of the 3-acyloxy compound) and this starting material is oxidized.

preferably with chromic acid, to yield a compound of the formula:

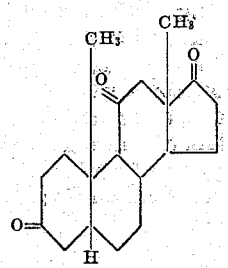

By thus oxidizing 3(a)-hydroxy-11,17-diketoetiocholane, 3,11,17-triketoetiocholane (M. P. 134-135° C.) is obtained.

Since certain changes in carrying out the above process, and certain modifications in the intermediates which embody the invention may be made without departing from the scope of the invention, it is intended that all matter contained in the above description shall be interpreted in an illustrative and not in a limiting sense.

What is claimed is:

1. $\Delta^{17,20}$-3$\alpha$-acetoxy-11-ketopregnene.

2. The process that comprises (a) treating a 3-acyloxy-11-keto-20-aminopregnane with nitrous acid to produce a first reaction mixture containing a 3 - acyloxy - 11-keto-20-hydroxypregnane, a $\Delta^{17,20}$-3-acyloxy-11-ketopregnene and a $\Delta^{20,21}$ - 3 - acyloxy - 11 - ketopregnene; (b) treating this resultant first reaction mixture with an aromatic sulfonyl halide and then refluxing the mixture with an organic base thereby removing the elements of the aromatic sulfonic acid and producing a second reaction mixture containing predominantly $\Delta^{17,20}$-3-acyloxy-11-ketopregnene and $\Delta^{20,21}$-3-acyloxy-11-ketopregnene; (c) treating this second reaction mixture with ozone to form corresponding ozonides and then decomposing the ozonides to produce a third reaction mixture of 3-acyloxy-11,17-diketoetiocholane and 3-acyloxy-11-keto-17-formyletiocholane; (d) oxidizing this third reaction mixture to convert the formyl compound to 3-acyloxy-11-ketoetiocholanic acid; (e) extracting said acid from the reaction mixture; and (f) treating said 3-acyloxy-11,17-diketoetiocholane with alkali under saponification conditions to produce 3-hydroxy-11,17-diketoetiocholane, said acyloxy groups being derived from lower aliphatic acids.

3. The process that comprises heating 3-acetoxy - 11 - keto - 20 - aminopregnane with nitrous acid to produce a first reaction mixture containing 3 - acetoxy - 11 - keto-20-hydroxypregnane, $\Delta^{17,20}$-3-acetoxy-11-ketopregnene and $\Delta^{20,21}$-3-acetoxy-11-ketopregnene; treating this first reaction mixture with an aromatic sulfonyl halide and then refluxing the mixture with an organic base thereby removing the elements of the aromatic sulfonic acid and producing a second reaction mixture containing predominantly $\Delta^{17,20}$-3-acetoxy-11-ketopregnene and $\Delta^{20,21}$-3-acetoxy-11-ketopregnene; treating this second reaction mixture with ozone to form the corresponding ozonides and then decomposing these ozonides to produce a third reaction mixture of 3-acetoxy-11,17-diketoetiocholane and 3-acetoxy-11-keto-17-formyletiocholane; oxidizing this third reaction mixture to convert the formyl compound to 3-acetoxy-11-ketoetiocholanic acid; extracting the said acid from the reaction mixture with alkali; and treating said 3-acetoxy-11,17-diketoetiocholane with alkali under saponification conditions to produce 3-hydroxy-11,17-diketoetiocholane.

4. The process that comprises heating 3-acetoxy - 11 - keto-20 aminopregnane with nitrous acid to produce a first reaction mixture containing 3-acetoxy - 11 - keto - 20 - hydroxypregnane, $\Delta^{17,20}$-3-acetoxy-11-ketopregnene and $\Delta^{20,21}$-3-acetoxy-11-ketopregnene; treating this first reaction mixture with a p-toluene sulfonyl chloride and then refluxing the mixture with an organic base selected from the group consisting of pyridine and collidine thereby removing the elements of the aromatic sulfonic acid and producing a second reaction mixture containing predominantly $\Delta^{17,20}$-3-acetoxy-11-ketopregnene and $\Delta^{20,21}$-3-acetoxy-11-ketopregnene; treating this second reaction mixture with ozone to form the corresponding ozonides and then decomposing these ozonides to produce a third reaction mixture of 3-acetoxy-11,17-diketoetiocholane and 3-acetoxy-11 keto-17-formyletiocholane; oxidizing this third reaction mixture to convert the formyl compound to 3-acetoxy-11-ketoetiocholanic acid; extracting the said acid from the reaction mixture with alkali; and recovering 3-acetoxy-11,17-diketoetiocholane.

5. The process that comprises reacting 3-acyloxy-11-ketoaminopregnane with nitrous acid treating the reaction mixture thus produced with an aromatic sulfonyl halide and then with a tertiary amine, oxidizing the resulting product successively with ozone and a permanganate, and recovering 3-acyloxy-11,17-diketoetiocholane said acyloxy groups being derived from lower aliphatic acids.

6. The process that comprises reacting 3-acyloxy-11-keto-aminopregnane with nitrous acid, treating the reaction mixture with an aromatic sulfonyl halide and then with collidine, oxidizing the resulting mixture successively with ozone and a permanganate, and recovering 3-acyloxy-11,17-diketoetiocholane said acyloxy groups being derived from lower aliphatic acids.

7. The process that comprises reacting a 3-acyloxy-11-keto-20-aminopregnane with nitrous acid to produce a compound of the class consisting of $\Delta^{17,20}$-3-acyloxy-11-ketopregnenes and $\Delta^{20,21}$-3-acyloxy-11-ketopregnenes said acyloxy groups being derived from lower aliphatic acids.

8. The process that comprises reacting a 3-acyloxy-11-keto-20-aminopregnane with nitrous acid in the presence of pyridine to produce a $\Delta^{17,20}$-3-acyloxy-11-ketopregnene said acyloxy groups being derived from lower aliphatic acids.

9. The process that comprises reacting 3-acetoxy-11-keto-20 aminopregnane with nitrous acid to produce $\Delta^{17,20}$-3-acetoxy-11-ketopregnene.

10. The process that comprises reacting a 3-acyloxy-11-keto-20-hydroxypregnane with an aromatic sulfonyl halide and heating the reaction product with a base to form the corresponding 3-acyloxy-11-ketopregnene said acyloxy groups being derived from lower aliphatic acids.

11. The process that comprises reacting 3-acetoxy-11-keto-20-hydroxypregnane with an aromatic sulfonyl halide and heating the reaction product with a base to form the corresponding 3-acetoxy-11-ketopregnene.

12. In the synthesis of 3-acetoxy-11,17-diketoetiocholane, the steps that comprise reacting 3-acetoxy-11-keto-20-hydroxypregnene with an aromatic sulfonyl halide, treating the reaction product thereby obtained with a basic substance to form $\Delta^{17,20}$-3-acetoxy-11-ketopregnene, and reacting the $\Delta^{17,20}$-3-acetoxy-11-ketopregnene with ozone to form 3-acetoxy-11,17-diketoetiocholane.

13. In the synthesis of 3-acetoxy-11,17-diketoetiocholane, the steps that comprise reacting 3-acetoxy-11-keto-20-hydroxypregnane with an aromatic sulfonyl halide, treating the reaction product with a tertiary amine to form $\Delta^{17,20}$-3-acetoxy-11-ketopregnene, and reacting the $\Delta^{17,20}$-3-acetoxy-11-ketopregnene with ozone to produce 3-acetoxy-11,17-diketoetiocholane.

LEWIS H. SARETT.

REFERENCES CITED

The following references are of record in the file of this patent:

UNITED STATES PATENTS

| Number | Name | Date |
|---|---|---|
| 2,094,045 | Schoeller | Sept. 28, 1937 |
| 2,184,299 | Hildebrandt | Dec. 26, 1939 |
| 2,226,627 | Marker | Dec. 31, 1940 |
| 2,254,562 | Bockmuhl | Sept. 2, 1941 |

OTHER REFERENCES

Reichstein: Helv. Chim. Acta, 20, pp. 978, 982 and 991 (1937).

Ruzicka: Helv. Chim. Acta, 25, 1297–1305 (1942).

Euw: Helv. Chim. Acta, 25, pp. 990, 998 and 1010 (1942); 2 ibid., 27, pp. 822 and 832 (1944).